United States Patent [19]

Krahn et al.

[11] Patent Number: 5,518,974
[45] Date of Patent: May 21, 1996

[54] DENSELY SINTERED, TABULAR CERAMIC PARTS OF ALUMINUM OXIDE HAVING IMPROVED THERMAL SHOCK RESISTANCE

[75] Inventors: Wolfgang Krahn; Johannes Ernst, both of Marktredwitz; Claudia Drabent, Fuchsmühl, all of Germany

[73] Assignee: Hoechst Aktiengesellschaft, Frankfurt am Main, Germany

[21] Appl. No.: 188,678

[22] Filed: Jan. 31, 1994

[30] Foreign Application Priority Data

Feb. 2, 1993 [DE] Germany .................. 43 02 795.4

[51] Int. Cl.⁶ .................................................. C04B 35/10
[52] U.S. Cl. .................................... 501/127; 501/153
[58] Field of Search ........................ 501/127, 153

[56] References Cited

U.S. PATENT DOCUMENTS

| | | | |
|---|---|---|---|
| 3,979,214 | 9/1976 | Trostel, Jr. | 106/44 |
| 4,591,383 | 5/1986 | McGarry et al. | 75/93 R |
| 4,595,665 | 6/1986 | Takayama et al. | 501/128 |
| 4,657,754 | 4/1987 | Bauer et al. | 423/625 |
| 4,678,762 | 7/1987 | Agarwal et al. | 501/127 |
| 4,954,462 | 9/1990 | Wood et al. | 501/95 |
| 4,996,177 | 2/1991 | Takagi et al. | 501/153 |
| 5,212,126 | 5/1993 | Fitch et al. | 501/100 |
| 5,242,298 | 9/1993 | Sernetz | 433/2 |
| 5,302,368 | 4/1994 | Harato et al. | 423/625 |

FOREIGN PATENT DOCUMENTS

| | | |
|---|---|---|
| 0281265 | 9/1988 | European Pat. Off. |
| 0497241 | 8/1992 | European Pat. Off. |
| 8905386 U | 8/1989 | Germany . |
| 3809693 | 10/1989 | Germany . |
| 4139166 | 6/1993 | Germany . |

OTHER PUBLICATIONS

*Introduction To The Principles Of Ceramic Processing*, James S. Reed, 1988 pp, 3, 12, 14–15.
Heinrich "Tape Casting Of Oxidic And Non–oxide Ceramic Powders", Keramische Zeitschrift, vol. 38 No. 2, 1986, pp. 79–82.

*Primary Examiner*—David Brunsman
*Attorney, Agent, or Firm*—Foley & Lardner

[57] ABSTRACT

The invention relates to a densely sintered tabular ceramic part of aluminum oxide having improved thermal shock resistance, which possesses a fine porosity of at most 10% by volume, does not contain inclusions having a diameter of $\geq 70$ µm within the ceramic microstructure and is not destroyed on immersion in a molten metal bath having a temperature of at least 350° C. The invention also relates to a process for producing such a shaped part.

6 Claims, 2 Drawing Sheets

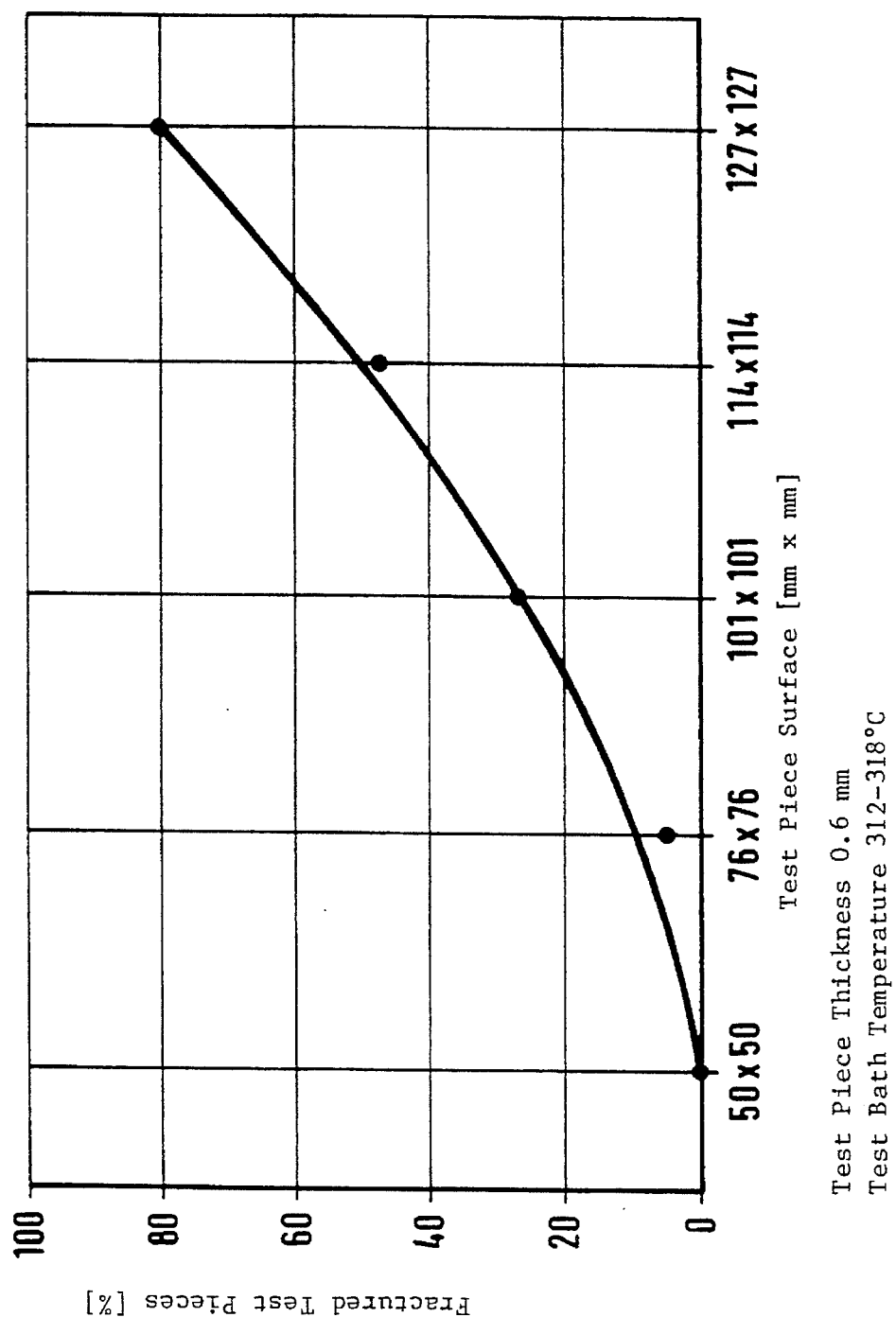

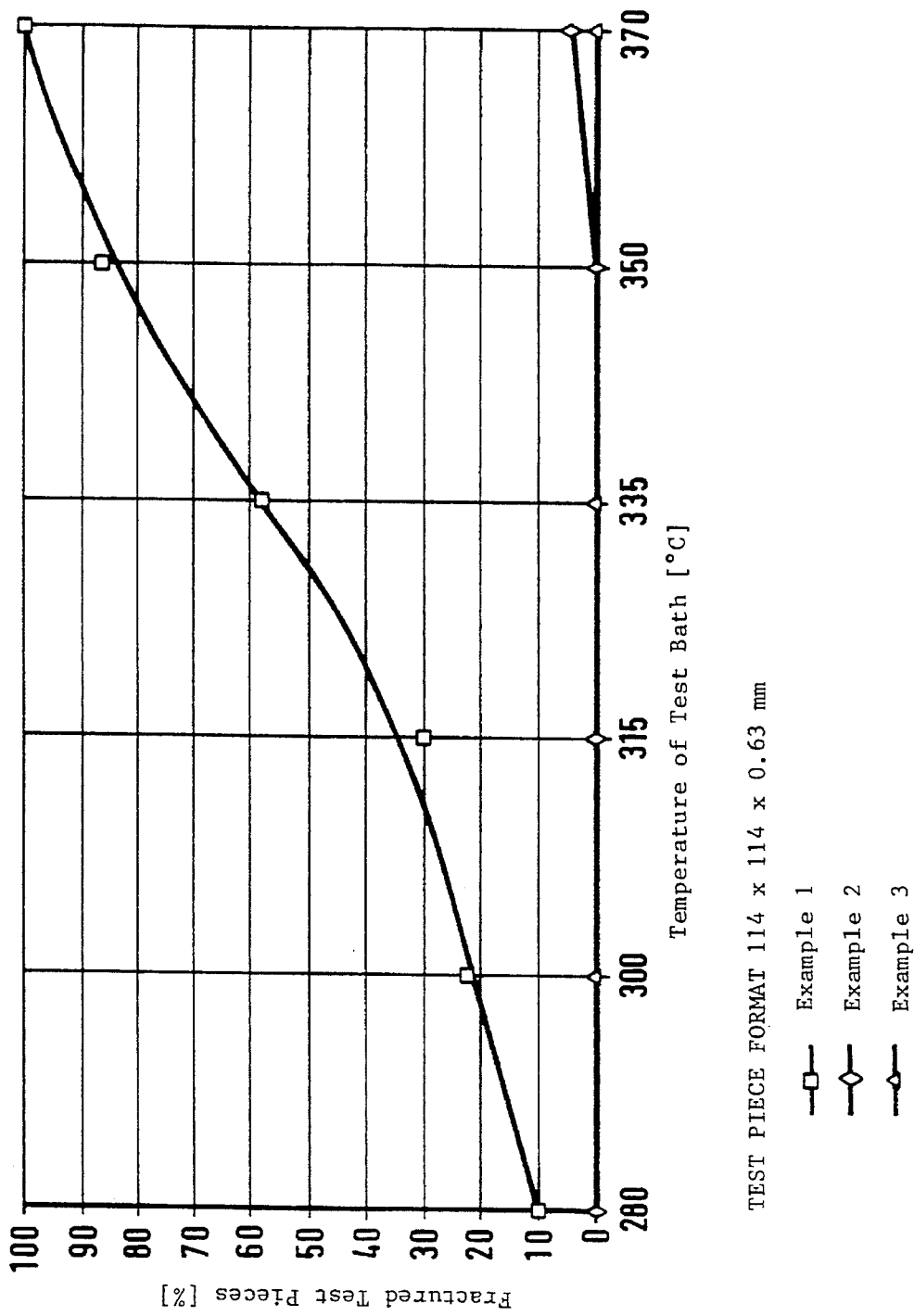
Fig. 2 Dependence of Fracture Sensitivity During Thermal Stressing on Test Bath Temperature

DENSELY SINTERED, TABULAR CERAMIC PARTS OF ALUMINUM OXIDE HAVING IMPROVED THERMAL SHOCK RESISTANCE

The invention relates to densely sintered tabular ceramic parts of aluminum oxide having improved thermal shock resistance and to a process for the production thereof.

Structural components made of aluminum oxide ceramic are widely used in various high quality products, inter alia, as ceramic substrates for electronic components and circuits, because of their particularly favorable material properties such as high compressive and flexural strength, low thermal expansion, high corrosion resistance, high temperature resistance, low specific gravity or very good electrical insulation properties.

For the intended purpose in electronic applications, the ceramic substrates are customarily coated with other materials, these other materials frequently being firmly bonded to the substrate. In this way, thick- or thin-layer circuits and metalized substrates are produced by direct copper bonding or by firing of refractory metals. In the production of electronic circuits on the ceramic substrate, it is often necessary to subject the material to various successive heat treatments. Coating processes themselves, but also drying processes, firing processes, soldering processes, bonding processes, separation processes or possibly even testing procedures for the electronic components can lead to the thermal stress limit of the ceramic material to be exceeded and cause the formation of microcracks within the ceramic or even cause fracture.

For the production of complex electronic circuits, there is a need for ceramic substrates having increasingly larger and larger areas; however, because of the growing component geometry, the probability of flaws increases as long as the material properties stay the same. At the same time, the necessity of higher productivity in the processing of the ceramic substrates demands a substantial reduction in the throughput time in manufacturing plants. In heat treatments, the materials are often subjected to faster and, in particular, steeper temperature changes, so that the demands made of the thermal shock resistance of the ceramic have grown exceptionally. Finally, the integration density of electronic circuits is increasing all the time. This is happening, for example, in hybrid technology through the building-up of multilayer circuit levels comprising strip conductors, resistances and dielectrics on the base substrate and linking of these levels. If the coefficients of thermal expansion of the applied circuit elements are different from the coefficient of thermal expansion of the substrate material, then stresses can be transmitted into the ceramic, which stresses can lead, particularly during rapid temperature change, to the component being damaged or destroyed. The thermal shock resistance of a substrate ceramic is therefore decisive as to whether it is suitable for an application.

Ceramic substrates are tabular bodies of materials such as aluminum oxide, aluminum nitride, mullite, beryllium oxide or silicon carbide. Due to its combination of many favorable properties, aluminum oxide has attained the widest distribution worldwide as a good compromise material. Preferred standard dimensions for aluminum oxide substrates were 50.8×50.8 mm until a few years ago, but today are 101.6×101.6 mm, 114.3×114.3 mm or 01.6×152.4 mm and the trend is toward even larger substrates in the future. The thickness of these substrates is generally from 0.25 to 1.3 mm. The substrates may be ground or unground. They may be grooved or notched and contain recesses of different geometries.

An object of the present invention is the production of shaped ceramic parts which have improved thermal shock resistance in comparison with the prior art.

This object is achieved by shaped parts of the generic type mentioned in the introduction, whose defining features are that they possess a fine porosity of at most 10% by volume, that they do not contain inclusions having a diameter of $\geq 70$ μm, preferably $\geq 50$ μm, particularly preferably $\geq 30$ μm, within the ceramic microstructure and that they are not destroyed on immersion in a molten metal bath at a temperature of at least 350° C.

Shaped ceramic parts are generally built up of a crystalline main phase, of pores and of secondary phases which may be either crystalline or amorphous. According to the invention, a fine porosity means a porosity having an average pore diameter in the range $\leq 20$ μm, preferably in the range $\leq 10$ μm, with macropores having a diameter of $\geq 50$ μm, preferably $\geq 100$ μm, being absent. Aluminum oxide materials normally contain, besides aluminum oxide, a glass phase and a crystalline secondary phase of magnesium spinel which is formed by chemical reaction of aluminum oxide with magnesium-containing components of the mix. Inhomogeneous distributions of the glass phase and the crystalline secondary phases can be due to poor comminution behavior of raw materials used, an example which may be mentioned being the siliceous mineral talc. A further cause of inhomogeneities can be poor deagglomerability of raw materials used. Examples of materials which are unfavorable here are magnesium-containing components, such as magnesium oxide which hydrates in water and can then, just like the frequently used basic magnesium carbonates, hardly be deagglomerated any more and leads to an inhomogeneous magnesium distribution in the microstructure.

Inhomogeneities in the ceramic material due to material of the same type are often also caused by large crystallites and hard agglomerates having diameters of up to 100 μm, often even more, which lead to flaws in the microstructure as a result of shrinkage behavior which deviates from that of the surrounding matrix during sintering. Traces of such particles can frequently be found in alumina raw materials. They arise during calcination of the aluminas and, because of their very long residence time in the furnace, are strongly sintered and can hardly be comminuted. Extraneous coarse particles which lead to flaws in the microstructure are frequently pieces broken off milling media and mill linings, which can arise in milling processes.

Other frequently observed inhomogeneities in the microstructure are macropores which can possess diameters in the range from 50 to 200 μm and more. Their cause may be air inclusions due to incomplete deaeration of the slip, particles which can burn out during sintering or particles which can swell in liquids. According to the invention, the presence of even a single macropore within the shaped part should be excluded, which is ensured by the particular production process.

The production of green bodies having sufficient geometric stability requires the addition of shaping aids to the ceramic powders prior to the shaping process. For this purpose, binders, dispersants, plasticizers and antifoaming agents are designated as shaping aids. As binders, it is customary to use organic polymers which, however, because of over-polymerization, contain particles which have often become insoluble or can swell in liquids. Swellable binder particles absorb solvent in the production of casting slips with a considerable increase in volume. When the slip is dried during the shaping of the green body, the swollen binder particles release the absorbed solvent again, shrink to their original size and leave very large pores in the green body, which pores are too large to close on subsequent sintering.

It has surprisingly been found that not only the mechanical stressability, as is known, but also the thermal stressability of a ceramic material is dependent on the homogeneity of the microstructure. The thermal stressability is reduced by a nonuniform distribution of secondary phases and by inhomogeneities, such as very large grains, sintered agglomerates, extraneous inclusions or macropores.

Improved thermal stressability of shaped ceramic bodies during abrupt changes in temperature is achieved according to the invention by the secondary phases within the ceramic microstructure being distributed more homogeneously. The more homogeneous distribution is achieved by the selection of suitable raw materials for use as sintering additives according to their chemical purity, particle size and their comminution behavior and also by more complete preparation of raw materials which are difficult to comminute or are not readily deagglomerated. To avoid macropores in the material, the binders used according to the invention for the production of ceramic compounds are, in particular, those polymeric binders in which swellable polymers are absent or present only in traces and in a size which is still harmless. Inhomogeneities such as very large grains, agglomerates, fragments from milling or other impurities are removed by complete selection from the prepared compound shortly before the shaping step.

For the production of the shaped bodies of the invention, commercial alumina having an $Al_2O_3$ content of at least 98% is first milled in a suitable mill to an average particle size which preferably lies close to the average primary particle size of the aluminum oxide powder in the range from 0.2 to 6 µm. Substances which are required as sintering aids and which contribute amounts of MgO, $SiO_2$ and CaO can already be added prior to the milling procedure. However, so as to obtain a good distribution of the sintering aids in the aluminum oxide it is more advantageous if those sintering additives which are insufficiently comminuted or deagglomerated during the milling of the aluminum oxide or which, during the processing of the aluminum oxide, form components which are difficult to deagglomerate, are milled separately and are only added to the ready-milled aluminum oxide prior to or during dispersion. Suitable sintering aids are firstly all minerals which give magnesium oxide, calcium oxide or silicon oxide during subsequent sintering. Examples of such minerals are talc, kaolin, magnesium carbonate, calcite, quartz or dolomite. As a result of their origin, these minerals frequently contain undesired extraneous materials and admixtures, for which reason the use of synthetic products of higher chemical purity as sintering aids is preferred according to the invention.

The milling of the alumina, if appropriate together with part of the sintering aids, is carried out in aqueous suspension. After milling, the water is removed, preferably by spray drying. If processing is continued in the aqueous system, it may be sufficient to merely reduce the water content by dewatering, preferably via a filter press. The milled and dried powder is then processed into a dispersion in a known manner via a further milling step using solvents with the addition of dispersants, binders, plasticizers and, if necessary, antifoaming agents. The dispersion procedure itself is preferably carried out in two stages, with the spray-dried powder first being dispersed only in the solvents and the dispersant. In this process step, the separately prepared sintering aids are also added and intimately mixed with the ceramic powders. In a second step, the addition of the binders and any other additives is carried out.

The slip obtained in this manner is deaerated by methods known per se and is freed of impurities of harmful size by means of a suitable separation device such as, for example, a sieve with a defined mesh size or a filter and further processed by conventional shaping methods. This can, for example, be carried out by casting into a plaster mold or by casting into a tape or a sheet out of which components are stamped after the slip has dried.

The green bodies obtained after shaping are subsequently sintered under conventional conditions at from 1500° to 1600° C.

The thermal shock resistance of the sintered shaped bodies is then tested by applying a sufficiently steep temperature gradient to a sufficient number of test pieces of suitable size, moving this gradient field at least partly over the test piece area and determining the number of test pieces which fail by fracture during this procedure. Such testing of the thermal shock resistance can be carried out, for example in accordance with DE-A-41 39 166, by immersing test pieces at room temperature, preferably in a group of 10 test pieces in each case, at a constant immersion rate into a bath of hot molten metal to a depth of at least 40 mm, and by then determining the number of test pieces which are destroyed during stressing. To improve the accuracy, those test pieces which have remained intact are, after cooling in air to room temperature, turned through 90° and are again stressed until finally every test piece which has remained intact has been tested at least four times.

BRIEF DESCRIPTION OF THE DRAWINGS

FIG. 1 shows how the fracture sensitivity on thermal stressing of identically produced groups of test pieces under constant test conditions is dependent on the test piece geometry or the test piece area stressed in each case.

FIG. 2 shows the proportion of fractured test pieces of the same geometry and its dependence on the applied temperature difference, i.e. the temperature of the molten metal in the test bath.

If the thermal shock resistance of two material variants is to be compared, test pieces having in each case the same state of treatment of the surfaces and the same component geometry are used, the experimental conditions are kept constant and the temperature of the test bath is selected so that during testing of ten pieces of the more sensitive variant, at least one test piece fails by fracture. If only components of different geometries are available for the thermal shock test, it is possible to obtain test pieces of the same size by suitable machining, such as cutting by means of lasers or saws with diamond tools, and to test these. Furthermore, it is self-evident that the stressability of shaped bodies having bored holes, notches and laser grooves or laser cuts is lower under the action of thermal shock than for test pieces with smooth surfaces, and that the test conditions must be correspondingly adapted.

The shaped ceramic bodies of the invention have a significantly increased survival probability during thermal shock stressing, which results in their particular suitability for purposes such as the production of substrates in thin- and thick-film technology and the production of multilayers, such as chip housings, heating or cooling elements through which fluid may flow, heat conductors and other metalized or unmetalized multilayers.

EXAMPLE 1 (COMPARATIVE EXAMPLE)

In an Alsing cylinder containing 2000 parts by weight of milling media (cylinders: Ø 20 mm), 1708 parts by weight of a mixture of various aluminas having average primary crystallite sizes from 2.2 to 3.2 µm and specific surface areas from 0.5 to 0.8 m²/g are milled with 37.8 parts by weight of talc, 36 parts by weight of kaolin, 11 parts by weight of basic magnesium carbonate and 7.2 parts by weight of wollastonite in 1100 parts by volume of water in such a way that an average particle size from 2.6 to 3.0 µm is established in the milled slip. The slip is subsequently spray-dried. The particle size distribution is determined according to the laser light scattering principle using the Laser Granulometre Cilas HR 850; prior to the measurement, the powder particles are dispersed in water together with 0.4% strength sodium polyphosphate solution for 1 minute under the action of ultrasound.

In an Alsing cylinder containing 240 parts by weight of milling media (cylinders: Ø 20 mm), 600 parts by weight of the spray-dried granulated material are dispersed in 176 parts by weight of a solvent mixture of trichloroethene and ethanol, to which 6 parts by weight of fish oil have been added, over a total time period of 23 hours. In a second step, 36.4 parts by weight of a mixture of poly(vinyl butyral), dioctyl phthalate and polyglycol are added to the Alsing cylinder and the mixture is then milled for a further 23 hours. Particle size analysis by light scattering measurement (HIAC) gave, in respect of insoluble particles in 50 ml of a 10% strength solution of poly(vinyl butyral) in ethanol, 44 particles having a diameter d of $90 \leq d \leq 140$ µm in the solution volume, for the batch used here.

The viscosity of the casting slip prepared in this way is about 9000 mPa.s in the milling drum, measured at 20° C. with a rotation viscometer. The slip is deaerated and filtered through a mesh sieve having a mesh opening of at least 150 µm, then applied to a continuous steel tape wetted with a release agent at a tape speed of 0.75 m/min and shaped into a tape having a dry thickness of 0.74 mm. The slip is then dried according to the countercurrent principle in a temperature gradient field rising from about 20° C. to about 80° C. to give a green ceramic sheet which is subsequently cut into strips and wound onto rollers. The green ceramic sheet so obtained was examined under the microscope in transmitted light. This showed that extraneous particles having diameters in some cases significantly >100 µm occurred at a concentration of 1 particle per 10 cm² predominantly on the underside of the cast sheet facing the steel tape. Chemical analysis of the particles taken therefrom showed that they were fragments of milling media.

Green bodies are shaped by stamping out of the strips of sheet, are coated with a release agent comprising a relatively unreactive oxidic granulated material and are sintered in multiple layers at 1590° C. After sintering, the cooled shaped bodies are separated, the release powder is brushed off and the parts are washed.

To test the thermal shock resistance, 50 test pieces with dimensions of 114×114×0.63 mm are immersed at a constant immersion rate of 1.5 mm/s into molten solder of the composition 63% Sn, 37% Pb at a temperature of at least 312° C., at most 318° C., to an immersion depth of 40 mm. The test pieces which have remained intact are then cooled in air to room temperature and immersed another three times under the same conditions, with the test pieces being turned through an angle of 90° in each case prior to each further test. The total failure by fracture under the action of thermal shock is 30% over all four test steps. Microscopic examination (SEM) of the fracture surfaces of test pieces destroyed by thermal shock showed macropores having a diameter of $\geq 100$ µm at the center of the fracture in over 80% of the test pieces.

EXAMPLE 2 (ACCORDING TO THE INVENTION)

In an Alsing cylinder, 1707 parts by weight of a mixture of aluminas having average primary particle sizes from 2.4 to 3.2 µm and specific surface areas from 0.5 to 0.8 m²/g are milled with 85 parts by weight of kaolin and 8 parts by weight of calcium carbonate having an average particle size from 0.25 to 0.40 µm with the addition of 2000 parts by weight of milling media (cylinders: Ø 20 mm) and 1200 parts by weight of water, in such a way that a particle size distribution having a $d_{50}$ from 2.7 to 3.0 µm is established in the milled slip. The slip obtained is spray-dried to remove the water.

In parallel, 20 parts by weight of ignited magnesium oxide having an average agglomerate size from 35 to 40 µm are milled together with 37 parts by weight of trichloroethene in an Alsing cylinder containing 30 parts by weight of milling media (cylinders: Ø 20 mm) until an average particle size $d_{50}$ of at most 0.8 µm is established.

In an Alsing cylinder containing 240 parts by weight of milling media (cylinders: Ø 20 mm), 600 parts by weight of spray-dried granules together with 9.5 parts by weight of the suspension of finely comminuted magnesium oxide in trichloroethene are dispersed in 174 parts by weight of a solvent mixture of ethanol and trichloroethene with the addition of 6 parts by weight of fish oil, over a time period of at least 23 hours. 36.4 parts by weight of a mixture of poly(vinyl butyral), dioctyl phthalate and polyglycol are subsequently added to the dispersed powders in the Alsing cylinder, and the mixture is milled for a further 23 hours. The poly(vinyl butyral) used as binder is selected so that on filtration of a solution of 10 g of poly(vinyl butyral) in 90 g of ethanol through a sieve having a mesh opening of 35 µm not more than 5 swollen binder particles having a size of over 100 µm remain as residue on the sieve. For the poly(vinyl butyral) batch selected here, particle size analysis by light scattering measurement (HIAC) in respect of insoluble particles in 50 ml of a 5% strength solution of poly(vinyl butyral) in ethanol gave only 3 particles having a diameter d in the range from $90 \leq d \leq 100$ µm in the solution volume.

The viscosity of a casting slip produced in this way is 9000–10,000 mPa.s in the milling drum, measured at 20° C. (rotation viscometer). The slip is degassed and freed of particles $\geq 70$ µm using a filter, prior to being applied at a rate of 0.75 m/min to a continuous steel tape wetted with release agent and being shaped into a tape having a dry thickness of 0.74 mm. The further processing procedure with production of the green bodies and the sintering thereof follows in the way described in Example 1.

To test the thermal shock resistance, 50 test pieces with dimensions 114×114×0.63 nun are again immersed at a constant immersion rate of 1.5 mm/s into molten solder of the composition 63% Sn, 37% Pb to an immersion depth of 40 mm, with the temperature of the solder bath being at least 347° C. but at most 353° C. The test pieces which have remained intact are cooled in air to room temperature and tested another three times under the same conditions, the test pieces being turned through an angle of 90° in each case prior to each further test. The total failure by fracture from thermal shock is 0% over all four steps.

To test the thermal shock resistance once more, 50 test pieces with dimensions 114×114×0.63 mm are again immersed at a constant immersion rate of 1.5 mm/s into molten solder of the composition 63% Sn, 37% Pb to an immersion depth of 40 mm, with the temperature of the solder bath being increased further and being at least 367° C. but at most 373° C. The test pieces which have remained intact are cooled in air to room temperature and tested a further three times under the same conditions, the test pieces being turned through an angle of 90° in each case prior to each further test. The total failure by fracture from thermal shock is 4% over all four test steps.

Microscopic analysis of the fracture surfaces resulted in large spinal crystallites being frequently identified in the fracture center, the formation of these crystallites being attributable to insufficient deagglomeration of the magnesium oxide.

EXAMPLE 3 (ACCORDING TO THE INVENTION)

In an Alsing cylinder, 1744 parts by weight of a mixture of various aluminas having an average primary particle size from 2.4 to 3.2 µm and a specific surface area from 0.5 to 0.8 m$^2$/g are milled together with 52 parts by weight of very fine quartz flour having an average particle size from 1.9 to 2.1 µm and 8 parts by weight of calcium carbonate having an average particle size from 0.25 to 0.40 µm with the addition of 2000 parts by weight of milling media (cylinders: Ø 20 mm) and 1100 parts by weight of water, until a particle size distribution of $d_{50}$=2.6 to 2.8 µm is established in the milled slip. The slip obtained is spray-dried.

In parallel, a suspension of ignited magnesium oxide in ethanol having a water content of max. 0.1% by weight and having a solids content of 20% by weight is prepared. This suspension is milled in a stirred ball mill with zirconium oxide milling media (spheres: Ø=0.6 to 1 mm) until the magnesium oxide has an average particle size from 0.4 to 0.5 µm, and is subsequently filtered via a 10 µm filter.

An Alsing cylinder containing 240 parts by weight of milling media (cylinders: Ø 20 mm) is charged with 163 parts by weight of a solvent mixture of trichloroethene and ethanol with the addition of 6 parts by weight of fish oil. 16.5 parts by weight of the suspension of very finely milled and filtered magnesium oxide in ethanol are added thereto and the material is mixed by slow rotation of the milling drum (≦10 rpm) for a time of at least 10 hours. 600 parts by weight of the spray-dried granules are then added and the mixture is milled for 23 hours. 36.4 parts by weight of a mixture of poly(vinyl butyral), polyglycol and dioctyl phthalate are subsequently added to the dispersed powders in the Alsing cylinder and the mixture is milled for a further 23 hours. The poly(vinyl butyral) used for the production of the casting slip meets the requirements described in Example 2 in respect of swellable particles.

The viscosity of the slip produced in this manner is from 8500 to 10,000 mPa.s in the milling drum, measured at 20° C. (rotation viscometer). The slip is then degassed and freed of residual particles having a diameter of a 30 µm with the aid of a sieve. The further processing of the slip into the finished shaped parts is carried out as described in Example 2.

In the test for thermal shock resistance, which was carried out exactly as described in Example 2, the failure by fracture of shaped parts of dimensions 114×114×0.63 was 0% over four test steps at both temperatures.

What is claimed is:

1. A process for the preparation of a densely sintered ceramic part of aluminum oxide having improved thermal shock resistance, which process comprises milling ceramic powder to an average particle size $d_{50}$ in the range from 1.2 to 4.5 µm, milling at least a part of sintering additives to an average size $d_{50}$ in the range from 0.1 to 1.1 µm, processing further the milled mixture to give a slip, then adding shaping aids which do not contain any components which can swell in the slip, removing all particles having a size of ≧70 µm from the slip, shaping the slip into tabular shaped parts by sheet casting, slip casting or pressure casting and sintering the shaped parts at temperatures in the range from 1400° to 1800° C.

2. Process as claimed in claim 1, wherein the ceramic powder is milled to an average particle size $d_{50}$ in the range from 2.6 to 3.1 µm, said at least a part of the sintering additives is milled to an average particle size $d_{50}$ in the range from 0.4 to 0.7 µm in an inert medium and all particles having a size of ≧50 µm are removed from the slip.

3. The process as claimed in claim 2, wherein all particles having a size of ≧30 µm are removed from the slip.

4. Process as claimed in claim 1, wherein the slip is shaped by sheet casting and the shaped parts are sintered at temperatures in the range from 1500° to 1600° C.

5. Process as claimed in claim 1, wherein said ceramic part has a tabular shape.

6. A process for the preparation of a densely sintered tabular shaped ceramic part of aluminum oxide having improved thermal shock resistance, which process comprises:

(a) milling ceramic powder to an average particle size $d_{50}$ in the range from 1.2 to 4.5 µm;

(b) separately milling at least a part of sintering additives to an average size $d_{50}$ in the range from 0.1 to 1.1 µm in an inert solvent to prevent hydrolysis of said sintering aids;

(c) combining said milled ceramic powder and said milled at least a part of sintering additives;

(d) processing further the milled mixture to give a slip;

(e) adding shaping aids which do not contain any components which can swell in the slip;

(f) removing all particles having a size of ≧70 µm from the slip;

(g) shaping the slip into tabular shaped parts by sheet casting, slip casting or pressure casting; and (h) sintering the shaped parts at temperature in the range from 1400° to 1800° C.

* * * * *